Dec. 17, 1940.　　　T. INAKI　　　2,225,221
AUTOMOBILE SIGNALING DEVICE
Filed April 21, 1939　　　2 Sheets-Sheet 1
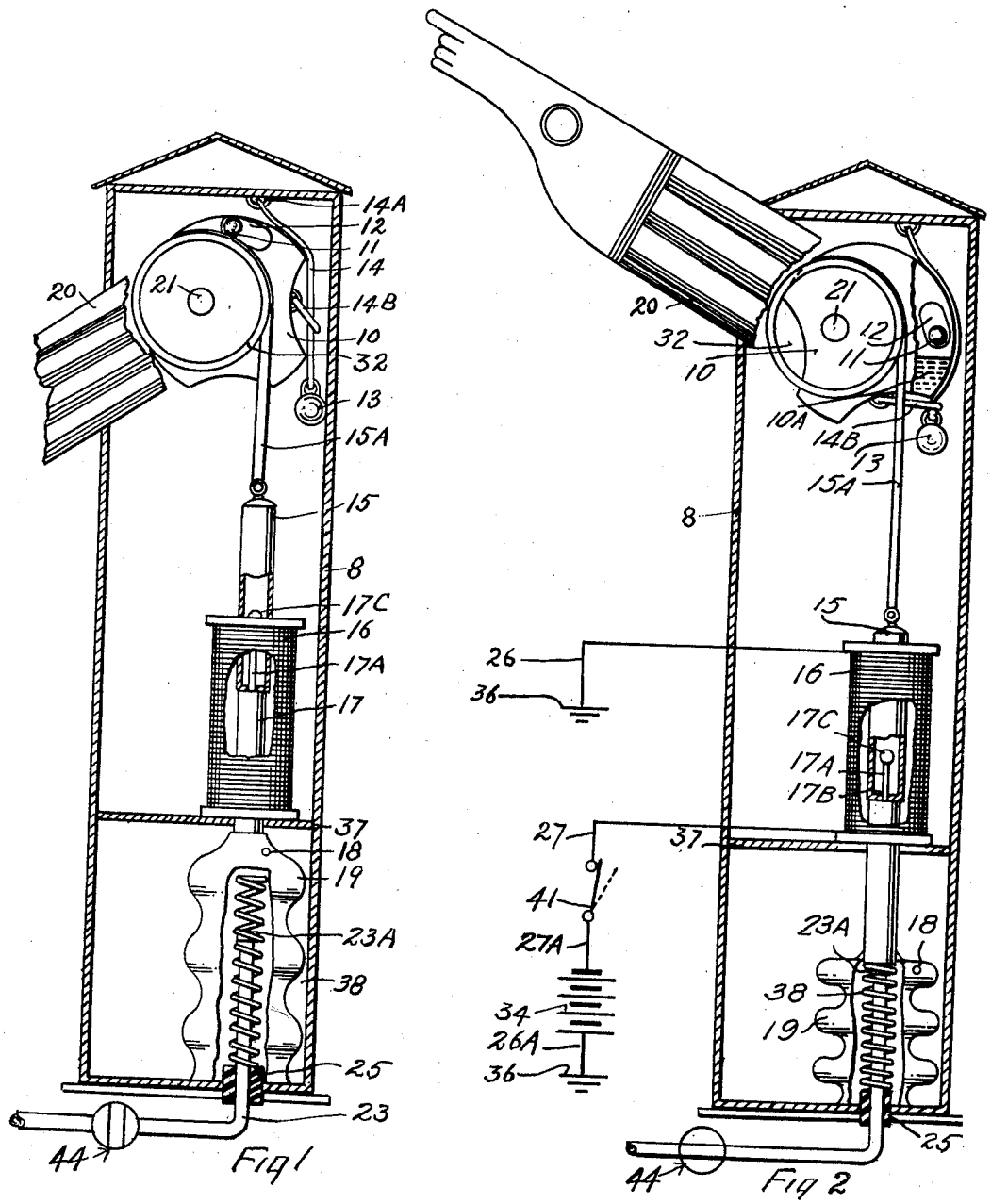
Toyojiro Inaki, Inventor
By Francis C. Huebner, Attorney

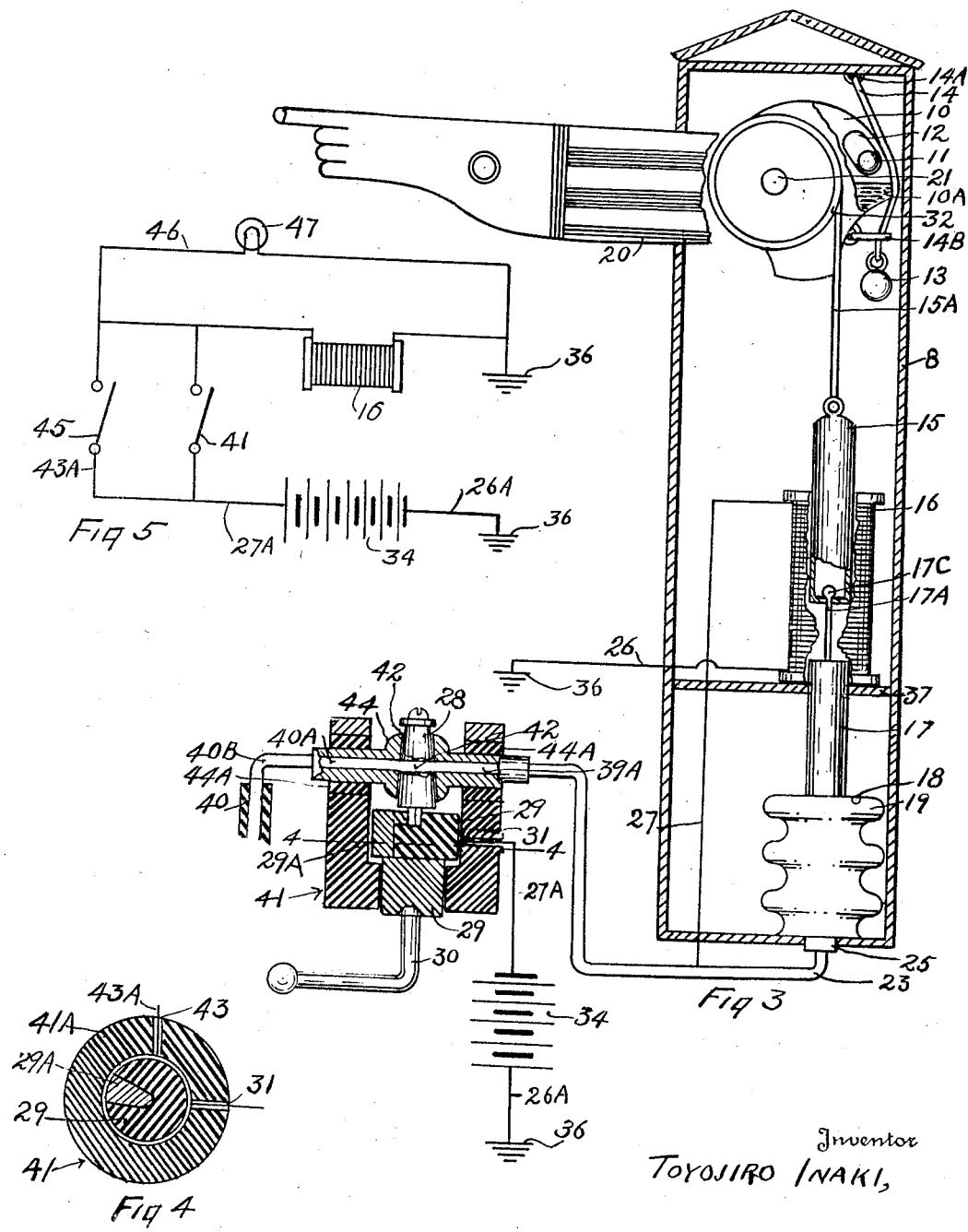

Patented Dec. 17, 1940

2,225,221

UNITED STATES PATENT OFFICE 2,225,221

AUTOMOBILE SIGNALING DEVICE

Toyojiro Inaki, Fresno, Calif.

Application April 21, 1939, Serial No. 269,201

3 Claims. (Cl. 177—327)

My invention relates to an automobile signaling device. It is well known that at present, the signal given by a driver of an automobile intending to slow his speed or to stop, to turn to the left or to the right is accomplished by the driver of the automobile holding out his hand or arm, pointing in an oblique downward, or horizontal, or obliquely upward position. As this is done by the driver sitting in the front of the car, it frequently happens that persons to the rear of the automobile cannot see the signals. In my device I have used an artificial arm controlled by either an electrical current or by air suction, operated at will by the driver of the car although all of the windows of the car may be closed. This signaling device can be placed at the front of the automobile, at the rear, or it can be attached to a trailer drawn by said automobile.

The object of my invention is a mechanical method for operating an automobile signaling device to be placed at one or more places on an automobile or on the trailer attached thereto. It is simple in construction, and elements already in use on the automobile are used to manipulate it.

In the drawings accompanying this specification, and hereby made a part hereof,

Fig. 1 is a plan view, partly in section, of the completed device, showing the mechanism adjusted to point the signal arm downward to indicate slowing, or stopping. The source of power for producing suction, and the wiring plan is not shown on this figure.

Fig. 2 is a view similar to that of Fig. 1, but shows the mechanism adjusted to point the signal arm upward, indicating a right hand turn, the wiring diagram connected therewith being shown.

Fig. 3 is a view similar to that shown in Fig. 1, but showing mechanism adjusted for the signal arm to point horizontally, indicating a left hand turn, and showing in detail, partly in section, the combined switch and valve for operating the electrical current and for controlling suction for operating the device.

Fig. 4 is a cross section view of the switch and valve along section line 4—4 in Fig. 3, Fig. 5 shows a wiring diagram.

Referring to the drawings accompanying this specification, and hereby made a part hereof, I have provided a housing 8, and a signal arm 20, which signal arm is pivotally mounted on the housing with pivot 21. A wheel 32 is mounted on pivot 21, and is attached rigidly to the signal arm 20 so that by turning wheel 32, the signal arm rotates with it. To counterbalance arm 20, I have provided a reservoir 10 which is partly filled with a liquid 10A. This liquid can be quicksilver, or an equivalent. In addition to the liquid balance, I have provided a chamber 12 in which a ball weight 11 can roll to either end. Chambers 10 and 11 are attached rigidly to wheel 32 and to signal arm 20 so that all move simultaneously.

In order to further facilitate the smooth movement of the signal arm 20, and to keep it from vibrating, a brake strap 14 is provided, which extends over the periphery of chamber wall 10, and drags thereon as the signal arm is moved. Strap 14 is attached to the housing at a location marked 14A. Said strap passes through a guide 14B, and at its free end is attached a weight 13. Weight 13 serves to make the strap effective as a brake, and also serves as a stop for the rotation of wheel 32 when weight 13 contacts guide 14B, as shown in Fig. 2.

A solenoid core 15 is attached with a flexible strap 15A to wheel 32, and is adapted to raise the signal arm 20 when the solenoid is energized. Coil 16 makes the solenoid core active when coil 16 is charged with an electric current. A lead 27 extends from coil 16 to switch 41, and lead 27A extends from the switch to a source of electrical energy, or battery 34. Wire 26A leads from battery 34 to ground, and wire 26 leads from coil 16 to ground. Coil 16 rests on support 37.

A soft iron magnet 17 is positioned at the lower end of coil 16. When the coil is charged with an electric current solenoid core 15 and soft iron magnet 17 are attracted together as shown in Figs. 1 and 2. As shown in Fig. 2, solenoid core 15 is hollow, and a stem 17A attached to soft iron magnet 17 extends through a hole 17B, in the bottom of solenoid core 15. Stem 17A acts as a guide in bringing solenoid 15 and magnet 17 together when energized. A tube 23, having a head 23A extends upward through the bottom of housing 8, and in line with the path of travel of magnet 17, and forms a stop in the downward path of travel of magnet 17. A compression spring 38 encircles tube 23, and eases the drop of magnet 17 on stop 23A. A rubber bag designated 19 on the drawings, is within housing 8, preferably at the lower end thereof and aligned with magnet 17, to which it is attached. Tube 23 leads to the interior of bag 19, to valve 44, and a tube 40B leads to the intake manifold of the automobile, not shown on the drawings. When valve core 28 is turned so that there is a free passage between the manifold and rubber bag 19, suction created by the automobile engine deflates the bag and draws soft iron magnet 17 downward. This position is shown in Fig. 3. This movement of the rubber bag will move signal arm 20 to a horizontal position. It will be noted in Fig. 3 that in moving signal arm 20 to the horizontal position the current of electricity is not used, and solenoid core 15 and magnet 17 are separated. The head 17C on stem 17A keeps solenoid core 15 and magnet 17 connected together.

The combined switch and valve 41 for regulating the use of the electric current and the air suction, consists of a circular block 41A, which includes a valve seat block 44, having a valve seat 42 therein, in which valve seat a conical valve core 28 is fitted. Valve block 44, to be used as a valve, is provided with a lead 39A therethrough, said lead 39A being connected at one end with tube 23, and at the other end with tube 40B. Valve core 28 has a hole 42 therethrough which is adapted to register with the openings connecting with tube 23 and lead 40B. It is noted that when hole 42 registers with tube 23 and lead 40B, there is a free passage from rubber bag 19 to the end of lead 40B, and by suction through those leads the rubber bag will be deflated. When valve core is turned so said openings are closed, suction from the rubber bag will be cut off.

Attached to valve core 28, and rotating with it is rotor 29, constructed principally of non conducting material as indicated on the drawings, but having a sector 29A of conducting material. A brush 31 of any ordinary type is adapted to contact element 29A when the rotor is rotated. The contact of brush 31 with sector 29A completes the electrical circuit to make the solenoid active.

It is noted in Fig. 3 that I have used tube 23 as a part of the electrical circuit. This tube therefore should be constructed of conducting material. Tube 23 is insulated from the housing with a covering 25 of insulating material. Valve 44 is insulated with rings 44A. Lead 40B is insulated from the ground by a connecton 40 composed of insulating material.

Fig. 5 shows a wiring diagram. In addition to the elements heretofore described it shows a stop light circuit 46 having a rear light 47, and a switch 45. Switch 45 is in practice attached to the brake pedal of the automobile, not shown in the drawings, so that when the brake pedal is used the signal is operated automatically. In Fig. 4 I have shown an extra brush 43, which brush connects with line 43A. Brush 43 is in normal engagement with sector 29A, to complete the circuit when the stop light circuit is used.

The device works in this manner: Referring to Fig. 1, valve 44 is shown as closed, which eliminates the action of suction and rubber bag 19 is normally erect as shown. Soft iron magnet 17 is held at its topmost point in its path of travel. Coil 16 is energized and pulls solenoid core 15 downward until stopped by soft iron magnet 17, thus pulling arm 20 to an oblique downward position.

In Fig. 2 the valve is open and the electrical circuit completed, bag 19 is compressed by suction from the motor as explained, and the soft iron is drawn downward by the rubber bag, and the solenoid core is drawn downward by the electrical energy in coil 16, so that the arm 20 assumes an oblique upward position as shown in Fig. 2.

In Fig. 3 the electric current is entirely cut out, valve 44 is open and suction depresses bag 19, pulling iron magnet 17 downward. The head 17C on stem 17A connected with soft iron magnet 17 engages solenoid core 15 and pulls arm 20 to the horizontal position shown in said Fig. 3.

Having described my invention I claim as new and ask for Letters Patent:

1. In an automobile signaling device having a signaling arm pivotally attached to a support, an extension on said arm beyond the pivotal support, means attached to the extension adapted to move said signaling arm to selective positions angular with a vertical line, consisting of a solenoid having a movable core, a connection between the movable core and the extension on the signaling arm, a movable stop positioned in the path of travel of the core of the solenoid, said stop being normally in close relation with the core of the solenoid by spring means, a bag of pliable material attached to the stop and adapted to pull said stop from its normal position when the bag is deflated, a second stop adapted to limit the movement of the first named stop, means for deflating the bag, and means for conducting an electrical current to the solenoid.

2. In an automobile signaling device having a signaling arm, pivotally attached to a support, an extension on said arm beyond the pivotal support, means for moving said arm on its pivot consisting of a solenoid with a movable core, a connection between the movable core and the extension on the signaling arm, means for transmitting an electrical current to the solenoid, a movable stop in the path of travel of the core of the solenoid consisting of a soft iron magnet, said soft iron magnet being held in normal position as a stop by a compression spring, a bag made of pliable material attached to said first mentioned stop, and adapted, when said bag is deflated, to pull the stop, and core of the solenoid against the spring tension beyond the position where the first mentioned stop was normally located, an auxiliary stop within the bag adapted to limit the movement of the first mentioned stop, means for energizing the solenoid, and means for deflating the bag.

3. In a device described in claim 2 having a sliding connection between the core of the solenoid and the movable stop.

TOYOJIRO INAKI.